United States Patent
Fleckenstein et al.

[11] 3,899,478
[45] Aug. 12, 1975

[54] BASIC AZO DYESTUFFS OF THE 2,6-DIAMINO-PYRIDINE SERIES

[75] Inventors: Erwin Fleckenstein, Hofheim, Taunus; Reinhard Mohr, Offenbach am Main; Ernst Heinrich, Frankfurt am Main, all of Germany

[73] Assignee: Hoechst Aktiengesellschaft, Frankfurt am Main, Germany

[22] Filed: May 2, 1973

[21] Appl. No.: 356,608

[30] Foreign Application Priority Data
May 5, 1972 Germany............................ 2222099

[52] U.S. Cl. ............... 260/156; 260/153; 260/154; 260/155
[51] Int. Cl............................................. C09b 29/36
[58] Field of Search...................................... 260/156

[56] References Cited
UNITED STATES PATENTS

| | | | |
|---|---|---|---|
| 2,068,353 | 1/1937 | Schneiderwirth.................. | 260/156 |
| 2,135,293 | 11/1938 | Renshaw et al..................... | 260/156 |
| 3,725,383 | 4/1973 | Austin et al. ........................ | 260/156 |

FOREIGN PATENTS OR APPLICATIONS

| | | | |
|---|---|---|---|
| 1,924,770 | 11/1970 | Germany............................. | 260/156 |
| 1,927,213 | 12/1969 | Germany............................. | 260/156 |
| 6,918,341 | 6/1970 | Netherlands....................... | 260/156 |
| 270,987 | 12/1950 | Switzerland........................ | 260/156 |

*Primary Examiner*—Henry R. Jiles
*Assistant Examiner*—Robert W. Ramsuer
*Attorney, Agent, or Firm*—Connolly and Hutz

[57] ABSTRACT
A basic azo dyestuff of the formula

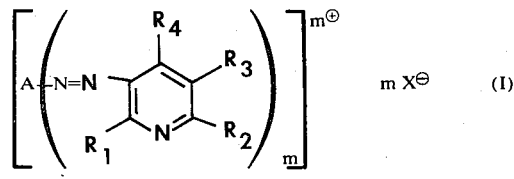

wherein A is an aromatic or heterocyclic diazo component, $R_1$ and $R_2$ each is primary, secondary or tertiary amino or hydrazino, $R_3$ is cyano, carbo lower alkoxy, carbamoyl, lower alkyl carbamoyl, di lower alkyl carbamoyl, lower alkylsulfonyl or phenylsulfonyl, $R_4$ is lower alkyl, substituted lower alkyl or phenyl, $m$ is 1 or 2 and X is an anion and at least one of the groups A, $R_1$, $R_2$ and $R_4$ contain a quaternary ammonium group of the formula

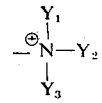

wherein $Y_1$ and $Y_2$ are hydrogen, lower alkyl, benzyl or cyclohexyl, $Y_3$ is hydrogen, lower alkyl, benzyl, cyclohexyl, lower alkoxy or amino or the nitrogen atom forms together with $Y_1$ and $Y_2$ or $Y_3$ a heterocyclic ring.

The novel dyestuffs are suitable for the preparation of writing and stamping inks or ball pen pastes and can be used for rubber printing. They are also suitable for the dyeing, printing or mass dyeing of tannined cellulose fibers, silk, hair, leather, coco fibers, jute, sisal or synthetic fibers, such as acetate silk, polyamide fibers or acid modified polyolefin, polyamide or polyester fibers, especially, however, of fibers containing polyacrylonitrile or polyvinylidene cyanide.

The dyeings obtained on these fibers have, mostly, a high tinctorial strength and, in general, good fastnesses to light and to wet processing.

7 Claims, No Drawings

BASIC AZO DYESTUFFS OF THE 2,6-DIAMINO-PYRIDINE SERIES

The present invention relates to basic azo dyestuffs, their preparation and their use.

These dyestuffs, which are free from sulfonic acid groups have the general formula I

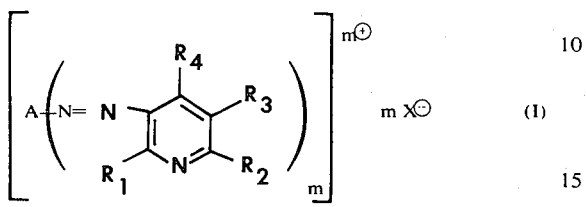

wherein A is the radical of an aromatic or heterocyclic diazo component, $R_1$ and $R_2$ each represents a primary, secondary or tertiary amino group or a hydrazino group, $R_3$ represents a cyano, carbalkoxy, an optionally substituted carbamoyl, alkylsulfone or arylsulfone radical, $R_4$ is an optionally substituted alkyl or aryl radical, $m$ is 1 or 2 and $X^\ominus$ is an anion and one of the radicals A, $R_1$, $R_2$ and $R_4$ at least contains a quaternary nitrogen atom.

The quaternary nitrogen atom which is contained in one of the radicals A, $R_1$, $R_2$ and $R_4$ has the formula

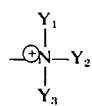

wherein $Y_1$ and $Y_2$ each represents hydrogen, an alkyl, aralkyl or cycloalkyl radical, $Y_3$ represents hydrogen, an alkyl, aralkyl, cycloalkyl or alkoxy radical or an amino group and N may form a heterocyclic ring with $Y_1$ and/or $Y_2$ and/or $Y_3$.

The dyestuffs may be prepared by coupling a. the diazonium compound of a quaternary amine of the formula II $$[A^\oplus - NH_2] \; X^\ominus \quad (II)$$

wherein $A^\oplus$ and $X^\ominus$ are defined as above, with a coupling component of the formula III

wherein $R_1$, $R_2$, $R_3$ and $R_4$ are defined as above, or by coupling b. the diazonium compound of an aromatic or heterocyclic mono- or diamine with a coupling component of the formula IV

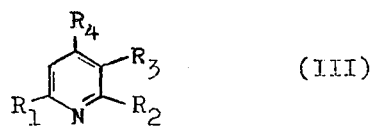

wherein $R_1$, $R_2$, $R_3$, $R_4$ and $X^\oplus$ are defined as above and one of the radicals $R_1$, $R_2$ and $R_4$ at least contains a quaternary nitrogen atom, or by treating c. an azo dyestuff of the formula V

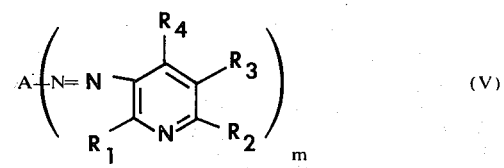

wherein A, $R_1$, $R_2$, $R_3$, $R_4$ and $m$ are defined as above, with alkylating agents, or by reacting d. an azo dyestuff of the formula V, which contains a reactive atom or a reactive group, with an amine, hydrazine or etherified hydroxyl amine.

The quaternary amines of the formula II which are used for the operating method (a) can be obtained by treating suitable aromatic or heterocyclic amines with alkylating agents, for example, with alkyl halides, aralkyl halides, halogenoacetamides, β-halogenopropionitriles, halohydrines, alkylene oxides, acrylic acid amides, alkyl esters of the sulfuric acid or of organic sulfonic acids.

Suitable quaternary amines of the formula II are those of the formula VI

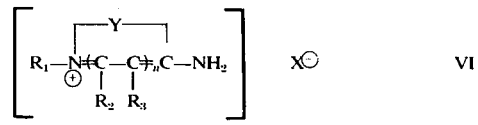

wherein $R_1$ is an alkyl or aralkyl radical which may be substituted, Y is a bivalent atom or a bivalent group necessary to complete a 5- or 6-membered ring, $R_2$ and $R_3$ each is hydrogen, alkyl radicals or substituents which form an annexed aromatic ring, $n$ is zero or 1 and X is an anion. Those quaternary compounds may be derived from amines of the series of pyridine, pyrazole, imidazole, triazole, tetrazole, oxazole, thiazole, selenazole, oxdiazole, thiadiazole, pyrimidine or triazine, or of the series of quinoline, indazole, benzimidazole, benzisothiazole, arylguanazole, naphthimidazole, benzoxazole, naphthoxazole, benzthiazole or naphthothiazole.

Suitable are furthermore quaternary amines of the formulae VII and VIII

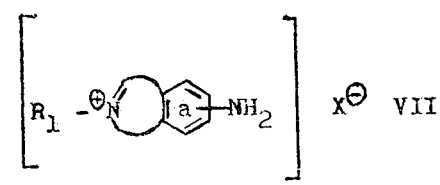

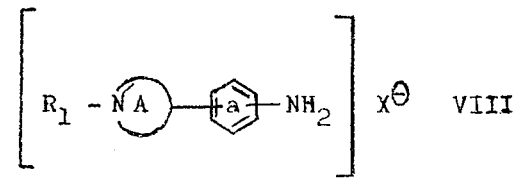

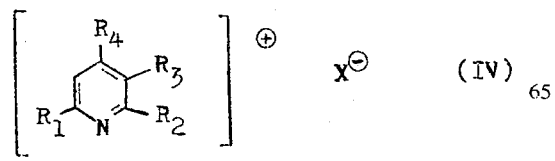

in each of which $R_1$ is an alkyl or aralkyl radical which may, both, be substituted, A is a 5- or 6-membered heterocyclic ring, for example, a pyridinium, triazolium, pyrazolium or thiazolium radical and X is an anion and the benzene radical $a$ may contain further substituents, for example halogen atoms, alkoxy, aryloxy, alkyl, trifluoromethyl, nitro, alkylsulfone, arylsulfone, cyano or acyl groups.

Suitable quaternary amines are, also, those of the formula IX

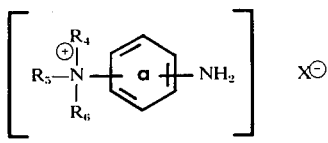  IX and of the formula X

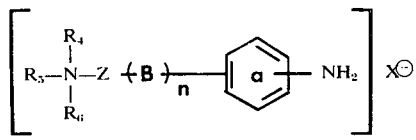  X in each of which $R_4$, $R_5$ and $R_6$ each is a low alkyl group which may be substituted, Z is a linear or branched low alkylene radical, an arylene or aralkylene radical, B is the group —O—, —S—, —CO—, —SO$_2$—, —CONH—, —OCO— or —SO$_2$NH—, $n$ is zero or 1 and X is an anion, and the benzene radical $a$ may contain further substituents, for example, halogen atoms, alkoxy, aryloxy, alkyl, trifluoromethyl, nitro, alkylsulfone, arylsulfone, cyano or acyl groups.

Suitable coupling components of the formula III are 2,6-diamino-, 2-amino-6-hydrazino- or 2-hydrazino-6-aminopyridines in which case the amino groups may be primary, secondary or tertiary. The secondary amino groups used are, especially, those of the formula —N-H—$R_5$ and the tertiary amino groups especially those of the formula

wherein $R_5$ is an optionally substituted alkyl, cycloalkyl, aralkyl, aryl or heterocyclic radical and $R_6$ is an optionally substituted alkyl or aralkyl radical or $R_5$ and $R_6$ are together with the nitrogen atom a heterocyclic radical. The hydrazino groups preferably used are N, N-dialkylamino-hydrazino groups.

As alkyl radicals in the coupling components III there may be used, for example, methyl, ethyl, propyl or butyl radicals, as aralkyl radicals, for example, benzyl, phenethyl or phenylpropyl radicals, as cycloalkyl radicals, for example, the cyclohexyl radical, as aryl radicals, for example, the benzene or naphthalene radical and as heterocyclic radicals, for example, imidazole, thiazole, benzthiazole, triazole or pyridine radicals which may, optionally, contain further substituents, for example, halogen atoms, such as fluorine, chlorine or bromine atoms, alkyl, alkoxy, hydroxy, cyano, acyloxy, carbalkoxy, carbamoyl, trifluoromethyl, acyl, acylamino, sulfamyl, primary, secondary, tertiary or quaternary amino groups or heterocyclic radicals, such as imidazole, thiazole, triazole or pyridine radicals.

The coupling components of the formula III can be obtained by converting the corresponding 2,6-dihydroxypyridines by treating them with acidhalogenating agents, for example, phosphoroxy chloride or phosphorus pentachloride, in the 2,6-dichloropyridines and substituting the chlorine atoms therein by amino groups. These chlorine atoms may, optionally, be exchanged in two stages, the first one for example, at a lower temperature of from about 30° to 100°C and the second one at an elevated temperature for example of from about 100° to 200°C. Thus, two different amino groups can be introduced. Identical amino groups are introduced by reacting at about 100° to 200°C.

The reaction may be effected in an inert organic solvent or in excess amine, optionally under pressure.

The amines of the formula II may be diazotized according to known methods, for example, with alkali metal nitrite and an inorganic acid, for example, hydrochloric acid, sulfuric acid or phosphoric acid, or with nitrosylsulfuric acid.

The coupling with the coupling components of the formulae III and IV may also be carried out in known manner, for example, in neutral to acid medium, if necessary, in the presence of sodium acetate or similar buffer substances influencing the coupling speed or of catalysts, for example, dimethyl formamide, pyridine or the salts thereof.

The starting dyestuffs of formula V used for the operating method c) may be obtained by coupling the diazotized amines of the formula A — NH$_2$ with the coupling components.

The operating method c) is especially suitable for amines of the formula XI

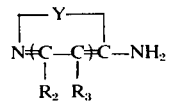  XI wherein Y, $R_1$ and $R_2$ are defined as above. Suitable amines of the formula X are those of the series of pyridine, pyrazole, imidazole, triazole, tetrazole, oxazole, thiazole, selenazole, oxidazole, thiadiazole, pyrimidine or triazine, furthermore of the series of quinoline, indazole, benzimidazole, benzisothiazole, arylguanazole, naphthimidazole, benzoxazole, naphthoxazole, benzthiazole or naphthothiazole.

Suitable alkylating agents are alkyl halides, aralkyl halides, halogenoacetamides, β-halogenopropionitriles, halohydrines, alkylene oxides, acrylic acid amide, alkyl esters of the sulfuric acid or alkyl esters of the organic sulfonic acids.

Suitable alkylating agents are for example methyl chloride, methyl bromide or methyl iodide, ethyl bromide or ethyl iodide, propyl bromide or propyl iodide, benzyl chloride, chloroacetamide, β-chloropropionitrile, ethylene chlorhydrine, dimethyl sulfate, benzene sulfonic acid methyl ester, p-toluenesulfonic acid methyl ester, -ethyl ester, -propyl ester or -butyl ester. The alkylation is advantageously effected in an inert organic solvent, for example, in a hydrocarbon, a chlorohydrocarbon or a nitrohydrocarbon, such as benzene, toluene, xylene, tetrachlorethane, chloroform, carbon tetrachloride, mono- or dichlorobenzene or nitrobenzene, in an acid amide or acid anhydride, such as dimethyl formamide, N-methylacetamide or acetic acid anhydride, in dimethylsulfoxide or in a ketone, such as acetone or methylethyl ketone. Instead of an organic solvent, an excess of the alkylating agent may also be used.

Depending on the number of nitrogen atoms of the starting dyestuff capable of being alkylated, one or more alkyl groups are introduced into the dyestuff molecule. The alkylation is effected at elevated temperature, if nacessary, by adding acid binding agents, for example, magnesium oxide, magnesium carbonate, sodium carbonate, calcium carbonate or sodium bicarbonate and, optionally, under pressure. The most favourable conditions in each case can easily be determined by preliminary tests.

The alkylation may also be carried out in water.

In a modified embodiment of the operating methods mentioned above, the dyestuffs of the invention may also be obtained by coupling a hydrazone or benzenesulfonyl hydrazone of the general formula XII

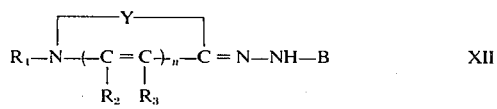

wherein $Y$, $R_1$, $R_2$, $R_3$ and $n$ are defined as above and B is a hydrogen atom or a benzenesulfonyl radical, with a coupling component of the formula III under the action of oxidating agents.

The novel dyestuffs contain as anion $X^\ominus$ preferably the rest of a strong acid, for example, the sulfuric acid or the semi-esters thereof, of an arylsulfonic acid or a hydrohalic acid. These anions used in the invention may also be replaced by anions of other acids, for example, the phosphoric acid, the perchloric acid, the acetic acid, the oxalic acid, the lactic acid, the propionic acid, the maleic acid, the malonic acid or the tartaric acid. The dyestuffs may also be obtained in the form of their double salts with zinc or cadmium halides. The nature of the anionic radical does not influence the properties of the dyestuffs if these colourless radicals do not affect the solubility of the dyestuffs in undesired manner.

The novel dyestuffs are suitable for the preparation of writing and stamping inks or ball pen pastes and can be used for rubber printing. They are also suitable for the dyeing, printing or mass dyeing of tannined cellulose fibers, silk, hair, leather, coco fibers, jute, sisal or synthetic fibers, such as acetate silk, polyamide fibers or acid modified polyolefin, polyamide or polyester fibers, especially, however, of fibers containing polyacrylonitrile or polyvinylidene cyanide. The dyeings obtained on these fibers have, mostly, a high tinctorial strength and, in general, good fastnesses to light and to wet processing, for example to washing, to fulling, to cross-dyeing, to carbonizing, to chlorine and to perspiration, as well as to decatizing, to steaming, to ironing, to rubbing and to solvents. The dyestuffs are, generally, insensible towards a modification of the pH of the dyebath and can, therefore, be used in slightly acid and in strongly acid baths. They are also stable at a temperature above 100°C as used in high-temperature dyeing. Wool is completely reserved by the dyestuffs under normal dyeing conditions.

The dyeing is in general carried out in an aqueous medium at the boiling temperature or at a temperature above 100°C under pressure in closed vessels. The dyestuffs may also be used from organic solvents.

To prepare the aqueous dyebaths and printing pastes, the dyestuffs may be used in the form of powders which may contain, if necessary, extenders, for example, inorganic salts, dextrin and, optionally, further additives. It is, however, more advantageous to use concentrated aqueous solutions of the dyestuffs which are easier to handle, for example those containing from about 20 to 60 % of dyestuff, one or more low aliphatic carboxylic acids, such as formic acid, acetic acid, propionic acid or lactic acid as well as further additives, such as water soluble polyvalent alcohols, the ethers or esters thereof, polyethers, aliphatic carboxylic acid amides, lactams, lactones, nitriles, dimethyl sulfoxide, diacetone alcohol, dioxane, tetrahydrofuran or urea and water.

To prepare the dyebaths which only contain organic solvents, for example, chlorohydrocarbons, concentrated solutions are advantageously used which contain the dyestuff as free base or as salt of a monobasic, organic acid and chlorohydrocarbons, organic acids and polar organic solvents.

The novel dyestuffs form with anionic precipitating agents, for example, argillaceous earth, tannine or heteropoly acids, for example, phosphorus tungstenic acid or phosphorus molybdenic acids, pigments fast to light which can advantageously be used in paper printing.

The following Examples illustrate the invention, the parts and percentages being by weight, unless stated otherwise:

EXAMPLE 1

4.57 Parts of 4'-aminophenacyltrimethyl ammonium chloride were dissolved in 20 parts of water and 7 parts of concentrated hydrochloric acid and diazotized with 4 parts of 5N sodium nitrite solution at 0°–5°C. After diazotization was completed 3.52 parts of 3-cyano-4-methyl-2,6-bis-methylamino-pyridine, dissolved in 10 parts of glacial acetic acid, were added to the diazo solution and this solution was stirred at pH 3 to 5 until coupling had been completed. The dyestuff was precipitated by adding sodium chloride, suction-filtered and dried at 40°C under vacuum. The dyestuff had the formula

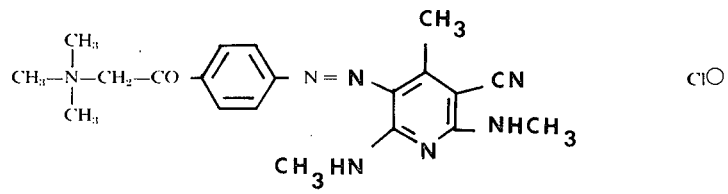

It dyed polyacrylonitrile and acid modified polyester fibers orange shades of very good fastness to light and to wet processing.

The following Table shows further dyestuffs of formula I which can be prepared in an analogous manner and the shades of the dyeings obtainable on polyacrylonitrile and acid modified polyester fibers:

| A and X(−) | R₁ | R | R₁ | Shade |
|---|---|---|---|---|
| (CH₃)₃N⊕—CH₂—CO—⟨C₆H₄⟩—Cl⊖ | —NHC₂H₅ | —CN | —CH₃ | Orange |
| dito | —NHC₃H₇ | —CN | —CH₃ | Orange |
| dito | —NHC₄H₉ | —CN | —CH₃ | Orange |
| dito | —NHCH₂CH₂OH | —CN | —CH₃ | Orange |
| dito | —NHCH₂CH₂CH₂OCH₃ | —CN | —CH₃ | Orange |
| dito | —NHCH₂CH₂OCOCH₃ | —CN | —CH₃ | Golden-yellow |
| dito | —N(CH₃)CH₂CH₂OH | —CN | —CH₃ | Orange |
| dito | —N(C₂H₅)₂ | —CONH₂ | —i-C₃H₇ | Orange |
| dito | —N⟨morpholino⟩ | —CONHCH₃ | —C₆H₅ | Orange |
| (CH₃)₃N⊕—CH₂—CO—⟨C₆H₄⟩—Cl⊖ | —NHC₆H₅ | —CN | —CH₃ | Orange |
| dito | —NH—⟨C₆H₄⟩—OCH₃ | —SO₂CH₃ | —CH₃ | scarlet |
| dito | —N(CH₃)CH₂CH₂Cl | —SO₂C₆H₅ | —C₂H₄OC₂H₅ | Orange |
| dito | —NH—CH(CH₃)₂ | —COOC₂H₅ | —C₂H₄—C₆H₅ | Orange |
| dito | —NH—⟨cyclohexyl⟩ | —CON(CH₃)₂ | —CH₂CN | Orange |
| dito | —NHCH₂—⟨tetrahydrofuryl⟩ | —COOCH₂C₆H₅ | —CH₂-pyridyl | Orange |
| dito | —NHCH₂—C₆H₅ | —CN | —CH₂-thiazolyl | Orange |
| (C₂H₅)₃N⊕—CH₂—CO—⟨C₆H₄⟩—Cl⊖ | —NHCH₃ | —CN | —CH₃ | Orange |
| (C₂H₅)₂N⊕(OC₂H₅)—CH₂—CO—⟨C₆H₄⟩—Cl⊖ | —NHCH₂CH₂OH | —CN | —CH₃ | Orange |
| CH₃—N⊕(CH₃)(NHCOCH₃)—CH₂—CO—⟨C₆H₄⟩—Cl⊖ | —NHC₂H₅ | —CN | —CH₃ | Orange |
| (CH₃)₃N⊕—CH₂—CO—⟨C₆H₄⟩—N=N—⟨C₆H₃(CH₃)⟩—Cl⊖ | —NHCH₃ | —CN | —CH₃ | red |
| (H₃C)₃N⊕—CH₂—CO—⟨biphenyl⟩—Cl⊖ | —N(CH₃)₂ | —CN | —CH₃ | scarlet |
| O₂N—⟨biphenyl⟩—COCH₂—N⊕⟨pyridyl-CH₃⟩  Cl⊖ | —NHC₂H₅ | —CN | —CH₃ | red |

| A and X⁻ | R₁ | R₂ | R₃ | R₄ | Shade |
|---|---|---|---|---|---|
| 3-nitro-phenyl ether linked to 4-(COCH₂CH₂N(CH₃)₃)⁺ phenyl; Br⁻ | —NHCH₃ | —NHCH₂CH₂OH | —CN | —CH₃ | Red |
| (CH₃)₃N⁺—CH₂—CO—(3-Br,4-substituted phenyl); Cl⁻ | —NHC₂H₅ | —NHCH₃ | —CN | —CH₃ | Orange |
| 2-methylpyridinium—CH₂—CO—C₆H₄—; I⁻ | —NHC₆H₅ | —NHCH₂CH₂CH₂OCH₃ | —CN | —CH₃ | Orange |
| quinolinium—CH₂—CO—C₆H₄—; Cl⁻ | —N(C₂H₅)₂ | —NHC₄H₉ | —CN | —CH₃ | Orange |
| 4-methylthiazolium—CH₂—CO—C₆H₄—; Cl⁻ | —NH-cyclohexyl | —NHC₃H₇ | —CN | —CH₃ | Orange |
| (H₅C₂)₃N⁺—CH₂—CO—(naphthyl); Cl⁻ | —NHC₃H₇ | —NHC₆H₅ | —CN | —CH₃ | scarlet |
| (CH₃)₃N⁺(CH₂)₃HNCO—C₆H₄—; Cl⁻ | —NHCH₂CH₂CH₃ | —NHCH₂CH₂OCOCH₃ | —CN | —CH₃ | Orange |
| pyridinium—CH₂CH₂COOC₂H₄—C₆H₄—; Cl⁻ | —NHCH₃ | —NHCH₃ | —CN | —CH₃ | Orange |
| 4-nitro-2-methyl-phenyl with OC₂H₄—N⁺(CH₃)₂—OCH₃; CH₃SO₄⁻ | —NHCH₂CH₂OH | —NHCH₂CH₂CN | —CN | —CH₃ | scarlet |
| (CH₃)₂N⁺(CH₂)₃HNSO₂—C₆H₄—; C₂H₅SO₄⁻ (with C₂H₅) | —NHC₆H₅ | —NHC₆H₅ | —CN | —CH₃ | scarlet |
| (CH₃)₃N⁺(CH₂)₃HNCO—C₆H₄—; Cl⁻ | —NH(CH₂)₃OCH₃ | —NH(CH₂)₃OCH₃ | —CN | —CH₃ | Orange |
| CH₃—N=N—triazolium—C₆H₄—; CH₃SO₄⁻ | —NHC₂H₅ | —NHC₂H₅ | —CN | —C₂H₅ | scarlet |

3,899,478

| A and N | | $R_1$ | $R_2$ | $R_3$ | $R_4$ | Shade |
|---|---|---|---|---|---|---|
| 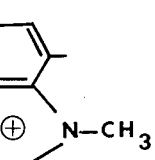 | $CH_3SO_4^{\ominus}$ | —NHCH₃ | —NHCH₃ | —CN | —CH₃ | Orange |
| do. | | —NHCH₂CH₂OH | —NHCH₂CH₂OH | —CN | —CH₃ | golden-yellow |
| do. | | —NHC₂H₅ | —NHC₂H₅ | —CN | —CH₃ | Orange |
| do. | | —NHC₃H₇ | —NHC₃H₇ | —CN | —CH₃ | scarlet |
| do. | | —NHC₃H₇ | —NCH₂CH₂OH<br>\|<br>CH₃ | —CN | —CH₃ | Orange |
| do. | | —NCH₂CH₂OH<br>\|<br>CH₃ | —NCH₂CH₂OH<br>\|<br>CH₃ | —CN | —CH₃ | Orange |
|  | Cl⊖ | —NHCH₃ | —NHCH₃ | —CN | —CH₃ | yellow |
| do. | | —NHCH₂CH₂OH | —NHCH₂CH₂OH | —CN | —CH₃ | yellow |
| do. | | —NHC₂H₅ | —NHC₂H₅ | —CN | —CH₃ | Orange |
| do. | | —NHC₃H₇ | —NHC₃H₅ | —CN | —CH₃ | golden-yellow |
| 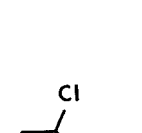 | Cl⊖ | —NHCH₃ | —NHCH₃ | —CN | —CH₃ | yellow |
| do. | | —NHC₂H₅ | —NHC₂H₅ | —SO₂CH₃ | —CH₃ | golden-yellow |
| do. | | —NHCH₃ | —NHCH₃ | —CN | —CH₃ | yellow |
| 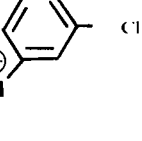 | | —NHCH₃ | —CN | —CH₃ | Orange | |

| A | $R_1$ | $R_2$ | $R_3$ | $R_4$ | Shade |
|---|---|---|---|---|---|
| 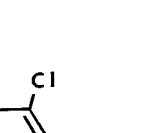 | —NHCH₂CH₂OH | —NHCH₂CH₂OH | —CN | —CH₃ | yellow |
| 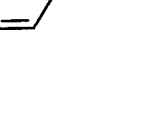 | —NHCH₃ | —NHCH₂CH₂NH₂ x HCl | —CN | —CH₃ | Orange |
| (3-methylphenyl) | —NHCH₂CH₂CH₃ | —NHCH₂CH₂CH₂N(CH₃)₂ x HCl | —CN | —C₆H₅ | Orange |
| (3-chlorophenyl) | —NHCH₃ | —NHCH₂CH₂N(CH₃)₂ x HCl | —CN | —i—C₃H₇ | Orange |
| CH₃O—(4-phenyl) | —NHCH₃ | —NHCH₂CH₂CH₂N(CH₃)₂ x HCl | —CN | —C₂H₅ | Orange |

-Continued

| A | R₁ | R₂ | R₃ | R₄ | Shade |
|---|---|---|---|---|---|
| O₂N–C₆H₄– | –NHCH₂CH₂CH₃ | –NHC₃H₆–N(morpholine) × HCl | –CN | –C₂H₅ | red |
| 3-CF₃–C₆H₄– | –N(CH₃)(CH₂CH₂OH) | –N(CH₃)(CH₂CH₂OH) × HCl | –CN | –CH₃ | Orange |
| CH₃SO₂–C₆H₄– | –HNCH₂CH₂CH₂N(CH₃)₂ × HCl | –N(CH₃)CH₂CH₂OH | –CN | –CH₃ | Orange |
| H₂NSO₂–C₆H₄– | –NHCH₃ | –NHC₃H₆NHC₂H₄OH × HCl | –CN | –CH₃ | Orange |
| CH₃COHN–C₆H₄– | –HNCH₂CH₂-(4-pyridyl) × HCl | –HNCH₂CH₂OH | –CN | –CH₃ | Orange |
| 3-(NHCOC₂H₄Cl)–C₆H₄– | –HNCH₂CH₂CH₃ | –HNC₃H₆–N(piperidine) × HCl | –CN | –CH₃ | Orange |
| CH₃O–C₆H₄–NH–C₆H₄– | –NHC₂H₅ | –NHC₃H₆N(C₂H₅)₂ × HCl | –CN | –CH₃ | red |
| 6-CH₃-benzothiazol-2-yl–C₆H₄– | –N(CH₃)CH₂CH₂OH | –N(CH₃)CH₂CH₂OH × HCl | –CN | –CH₃ | Orange |
| C₆H₅–N=N–C₆H₄– | –NHCH₃ | –NHCH₂CH₂N(CH₃)₂ × HCl | –CN | –CH₃ | red |
| NC–C₆H₄– | –NHCH₂CH₂CN | –NH(CH₂)₃N(CH₃)₃⁺ CH₃SO₄⁻ | –CN | –CH₃ | Orange |
| C₆H₅– | –NHCH₃ | –NH–N(morpholine) × HCl | –CN | –CH₃ | Orange |
| 4-pyridyl–CONH–C₆H₄– | –NHCH₃ | –HNC₃H₆N(C₂H₅)₂ × HCl | –CN | –CH₃ | Orange |
| CH₃O–C₆H₄–HN–C₆H₄– | –NHCH₃ | –HNC₃H₆N(C₂H₅)₂ × HCl | –CN | –C₂H₅ | red |
| CH₃O₂S–(2-Cl-C₆H₃)– | –NHCH₂CH₂CH₃ | –HNC₂H₄N(CH₃)₂ × HCl | –CN | –CH₃ | Orange |
| HOH₄C₂O–C₆H₄– | –N(CH₃)₂ | –N(CH₃)CH₂CH₂CH₂OCH₃ × HCl | –CN | –CH₃ | Orange |
| 3-(SO₂CH₃)–C₆H₄– | –NHCH₃ | –NHCH₂CH₂N(CH₃)₃⁺ Cl⁻ | –CN | –CH₃ | Orange |

—Continued

| | | | | | |
|---|---|---|---|---|---|
| biphenyl | —NHC₂H₅ | —NHC₂H₄N(CH₃)₂ OCH₃ CH₃SO₃⁻ | —CN | —CH₃ | Orange |
| diphenylmethane | —NHC₆H₅ | —NHCH₂CH₂N(CH₃)₂ Br⁻ CH₂CH₂COOCH₃ | —CN | —CH₃ | Orange |
| 2,3-dichlorophenyl | —NH(CH₂)₃N(CH₃)₂ · HCl | —NHN(C₂H₅)₂ | —CN | —CH₃ | Orange |
| phenyl | —NHCH₃ | —NHCH₃ | —CN | —CH₂-(N-methylpyridinium) CH₃SO₃⁻ | golden-yellow |
| 4-chloro-2-cyanophenyl | —NHCH₃ | —NHC₂H₄N(CH₃)₂ Cl⁻ NH₂ | —CN | —CH₃ | Orange |
| 3-chlorophenyl | —HNCH₂CH₂CH₂CH₃ | —NH-C₆H₄-CH₂N(CH₃)₃⁺ CH₃SO₃⁻ | —CN | —CH₃ | Orange |
| azobenzene | —NHC₂H₄N(CH₃)₃⁺ CH₃SO₃⁻ | —NHC₆H₅ | —CN | —CH₃ | red |
| 2,4-dichlorophenyl | —NHCH₃ | —NH-C₆H₄-N(CH₃)₃⁺ Cl⁻ | —CN | —CH₃ | Orange |
| 4-chlorophenyl | —NHC₂H₅ | —NH(CH₂)₃N(CH₃)₂ NH₂ Cl⁻ | —CN | —CH₃ | Orange |

EXAMPLE 2

19.8 Parts of 4,4'-diaminodiphenyl methane were dissolved in 58 parts by volume of concentrated hydrochloric acid and 400 parts by volume of water. The solution was diazotized at 0°–5°C by adding 50 parts by volume of 4 N sodium nitrite. The diazo solution was added to a solution of 49.4 parts of 3-cyano-4-methyl-6-monomethylamino-2-γ-dimethylaminopropylamine-pyridine in 300 parts by volume of water at 0°–5°C. After coupling completed, the dyestuff was precipitated by adding salt, separated by filtration, dissolved in hot water and salted out of the filtrate after filtration of the solution. The precipitated dyestuff had the formula

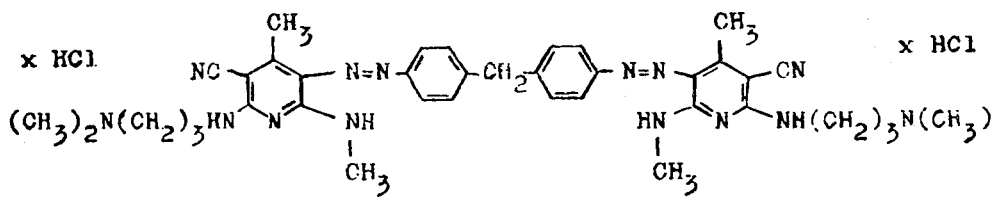

It was separated by filtration and dried. It dyed polyacrylonitrile fibers orange shades of very good fastness to light and to wet processing.

The following Table shows further dyestuffs of the formula I which can be prepared in an analogous manner and the shades obtainable on polyacrylonitrile fibers:

| A | $R_1$ | $R_2$ | $R_3$ | $R_4$ | Shade |
|---|---|---|---|---|---|
| -⌬-O-⌬- | —NHCH₃ | —NH(CH₂)₂N(CH₃)₃ ⊕ CH₃SO₄ ⊖ | —CN | —iso C₃H₇ | red |
| -⌬-S-⌬- | —NHCH₂CH₂CH₃ | —NHC₂H₄NH₂ × HCl | —SO₂CH₃ | —C₄H₉ | red |
| -⌬-SO₂-⌬- | —NHCH₂CH₂OH | —NHC₂H₄N(CH₃)₃ ⊕ CH₃SO₄ ⊖ | —CN | —C₂H₅ | Orange |
| -⌬-CO-⌬- | —NHCH₂CH₂N(CH₃)₂ × HCl | —NHC₆H₅ | —CN | —CH₃ | Orange |
| -⌬-NHCONH-⌬- | —NHCH₂CH₂CH₂N(CH₃)₃ ⊕ CH₃SO₄ ⊖ | —NHCH₂CH₂OH | —CN | —C₆H₅ | Orange |
| -⌬-OCH₂CH₂O-⌬- | —NHC₆H₅ | —NH-⌬-N(CH₃)₃ ⊕ CH₃SO₄ ⊖ | —SO₂CH₃ | —CH₃ | Orange |
| -⌬-⌬- | —NHCH₂CH₂CN | —NHCH₂CH₂N(CH₃)₂ × HCl | —CN | —CH₃ | scarlet |
| -⌬-CH₂-⌬- | —NHCH₂CH₂CH₃ | —NH-⌬-CH₂N(CH₃)₂ × HCl | —CN | —CH₃ | Orange |

EXAMPLE 3

4.14 Parts of 6-dimethylaminomethyl-2-aminobenzthiazole were dissolved in 50 parts by volume of phosphoric acid. At −5°C 1.5 parts of sodium nitrite were introduced and after a 3 hours' stirring 1.5 parts of urea were added. The diazo solution was added to a solution of 3.52 parts of 3-cyano-4-methyl-2,6-bis-methylamino-pyridine in 50 parts by volume of 2N hydrochloric acid. After coupling had been completed the coupling mixture was neutralized.

The dyestuff precipitated had the formula:

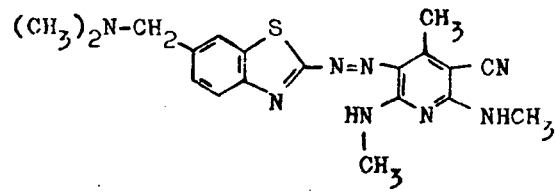

It was separated by filtration, washed and dried. It dyed polyacrylo-nitrile fibers red shades of very good fastness to light and wet processing.

The following Table shows further dyestuffs of formula I which can be prepared in an analogous manner and the shades of the dyeings obtainable on polyacrylonitrile fibers:

| A | $R_1$ | $R_2$ | $R_3$ | $R_4$ | Shade |
|---|---|---|---|---|---|
| CH₂HNO₂S–CH₂–N(C₂H₅)₂ benzothiazole × HCl | —HNCH₃ | —HNCH₃ | —CN | —CH₃ | Orange |
| (CH₃)₂N(CH₂)₃HNCO– benzothiazole × HCl | NHCH₂CH₃ | —NHCH₂CH₂OH | —CN | —CH₃ | Orange |
| (C₂H₅)₃NH₃C₂OOC– benzothiazole C₂H₅SO₄ ⊖ | —NH(CH₂)₂CH₃ | —NHC₆H₅ | —CN | —CH₃ | Orange |
| piperidinyl–CH₂– thiazole × HCl | —NHCH₃ | —NHC₆H₅ | —CN | —CH₃ | Orange |
| CH₃O– benzothiazole | —NHCH₂CH₂OH | —NH(CH₂)₄N(CH₃)₃ ⊕ CH₃SO₄ ⊖ | —CN | —CH₃ | scarlet |

| A | $R_1$ | $R_2$ | $R_3$ | $R_4$ | Shade |
|---|---|---|---|---|---|
| 6-Cl-benzothiazol-2-yl | —NHCH₂CH₂OH | —NH(CH₂)₂N(CH₃)₂ · C₆H₅CO / NH₂ | —CN | —CH₃ | scarlet |
| thiazol-2-yl | —NHCH₃ | —HNCH₂CH₂N(C₂H₅)₂ × HCl | —CN | —CH₃ | Orange |
| 4-phenyl-thiazol-2-yl | —NHCH₃ | —HNCH₂CH₂N(C₂H₅)₂ × HCl | —CN | —CH₃ | Orange |
| 3-phenyl-1,2,4-thiadiazol-5-yl | —NHCH₃ | —HNCH₂CH₂N(C₂H₅)₂ × HCl | —CN | —CH₃ | Orange |
| 3-methyl-1-phenyl-pyrazol-5-yl | —NHCH₃ | —NH(CH₂)₃N(CH₃)₂ × HCl | —CN | —CH₃ | Orange |
| 1H-1,2,4-triazol-3-yl | —NHCH₃ | —NH(CH₂)₃N(CH₃)₂ × HCl | —CN | —C₆H₅ | yellow |
| 5-methyl-1,3,4-thiadiazol-2-yl | —NHCH₂CH₃ | —NHCH₂CH₂N(CH₃)₃ ⊕ CH₃SO₄⊖ | —CN | —C₆H₅ | Orange |
| pyridin-3-yl | —NHCH₂CH₃ | —NHCH₂CH₂N(CH₃)₃ ⊕ CH₃SO₄⊖ | —CN | —CH₃ | yellow |
| 3-methyl-pyrazol-5-yl (H) | —NH(CH₂)₄CH₃ | —NHCH₂CH₂—N⊕(pyridinium) CH₃SO₄⊖ | —CN | —CH₃ | yellow |
| indazol-3-yl (H) | —NHCH₂CH₂OH | —NHCH₂CH₂CH₂N(C₂H₅)₂ C₂H₅SO₄⊖ | —CN | —CH₃ | Orange |
| 6-methyl-benzothiazol-2-yl | —N(CH₃)CH₂CH₂OH | —N(CH₃)CH₂CH₂OH × HCl | SO₂CH₃ | —CH₃ | scarlet |

EXAMPLE 4

8.4 Parts of 3-amino-1,2,4-triazole were stirred in 12 parts by volume of water and after 30 minutes 30 parts by volume of sulfuric acid of 96 % strength were added so slowly that the temperature did not exceed 50° to 60°C. The limpid solution was cooled to 0°–5°C and the amine was diazotized at that temperature by adding dropwise 15.2 parts by volume of nitrosyl sulfuric acid (about 41 % strength) during about 15 minutes. Stirring was continued at 5°–10°C for another 30 minutes and then the nitrosyl melt was poured onto a mixture of ice and water. After destruction of a slight excess amount of nitrite the diazo solution was introduced into a solution of 17.6 parts of 3-cyano-4-methyl-2,6-bis-methylamino-pyridine in 100 parts of 2 N hydrochloric acid. After coupling had been completed the solution was made neutral with sodium hydroxide solution, the precipitated dyestuff of the formula

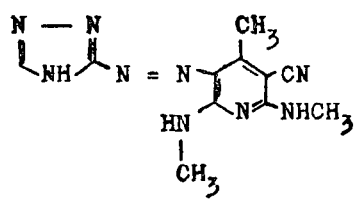

was suction-filtered and washed with water. The moist filter cake was stirred with 11 parts of magnesium oxide in 100 parts by volume of water, heated to 60°–70°C and, during about 30 minutes, 45 parts by volume of dimethyl sulfate were added. The mixture was stirred at 60°C until the quaternization had been completed, hot water was added and suction-filtration followed after adding some charcoal and kieselguhr. The dyestuff had the formula

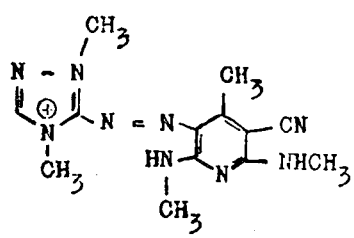

It was precipitated by adding sodium chloride, separated by filtration and dried at about 60°C. It dyed polyacrylonitrile fibers golden-yellow shades of excellent fastness to light and to wet processing.

EXAMPLE 5

14.4 Parts of 4-chloro-2,6-diamino-N-methylaniline sulfate as monohydrate were dissolved in 25 parts by volume of sulfuric acid of 95 % strength, while stirring. After cooling to 0°–5°C 16.6 parts by volume of nitrosylfuric acid (of about 41 % strength) were added dropwise, so that the temperature remained at 8°–10°C.

The mixture was stirred for another hour and the nitrosyl melt was poured onto ice and water. The nitrite excess was destroyed with some amidosulfonic acid. Then, a solution of 8.8 parts of 3-cyano-4-methyl-2,6-bis-methylamino-pyridine in 100 parts by volume of glacial acetic acid were added dropwise to the filtered diazo solution at 10°C. The dyestuff was suction-filtered after coupling had been completed, washed with water, stirred in 100 parts of water and made neutral with a 2N sodium carbonate solution. The precipitated dyestuff had the formula

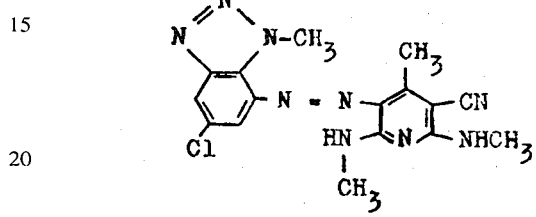

It was suction-filtered, washed with water and dried at 60°C.

For quaternization, 18.5 parts of the dried dyestuff were dissolved in 500 parts by volume of chlorobenzene. To eliminate the last traces of water, about 100 parts by volume of chlorobenzene were separated by distillation, 0.6 part of magnesium oxide were added and for about 90 minutes at 60°–65°C, 12 parts by volume of dimethyl-sulfate were added dropwise. The mixture was stirred until quaternization had been completed, it was suction-filtered, washed with chlorobenzene and dried at 60°C. The dyestuff had the formula

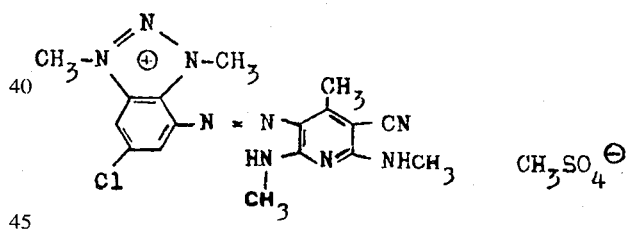

It dyed polyacrylonitrile fibers red shades of very good fastness to light and to wet processing.

The following Table shows further dyestuffs of the formula I and the shades of the dyeings obtainable on polyacrylonitrile fibers, acid modified polyamide and acid modified polyester fibers:

| A and X | | $R_1$ | $R_2$ | $R_3$ | $R_4$ | Shade |
|---|---|---|---|---|---|---|
| CH₃—N⊕ (indazolium) CH₃ | CH₃SO₄⁻ | —NHCH₃ | —NHCH₃ | —CN | —CH₃ | Violet |
| dito | | —NHCH₂CH₂OH | —NHCH₂CH₂OH | —CN | —CH₃ | red |
| dito | | —NHCH₂CH₃ | —NHCH₂CH₃ | —CN | —C₆H₅ | Violet |
| dito | | —NCH₂CH₂OH, CH₃ | —NCH₂CH₂OH, CH₃ | —SO₂CH₃ | —C₂H₅ | Violet |
| dito | | —NHCH₃ | —NHC₆H₅ | —C(=O)NHCH₃ | —CH₃ | Violet |

| A and X⁻ | R₁ | R₂ | R | R₁ | Shade |
|---|---|---|---|---|---|
| 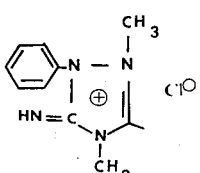 | —NHC₂H₅ | —NHCH₃ | —CN | —CH₃ | red |
| dito | —NH(CH₂)₃OCH₃ | —NH(CH₂)₃OCH₃ | —CN | —CH₃ | red |
| 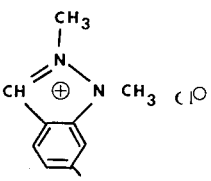 | —N(C₂H₅)₂ | —NHCH₂CH₂OH | —CN | —CH₃ | Orange |
| dito Cl⁻ | —NHCH₃ | —NHCH₃ | —CN | —CH₃ | Orange |
| 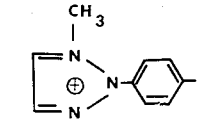 | —N⌐O | —N⌐O | —CN | —CH₃ | Orange |
| 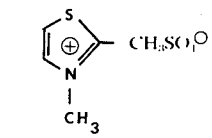 | —NHCH₃ | —NHCH₃ | —CN | —CH₃ | red |
| 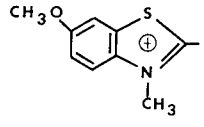 | —NHCH₃ | —NHCH₃ | —CN | —CH₃ | red |
| 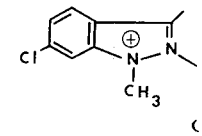 | —NHCH₃ | —NHC₂H₅ | —CN | —CH₃ | red |
| 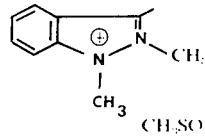 | —NHC₂H₅ | —NHC₂H₅ | —CN | —CH₃ | red |
| 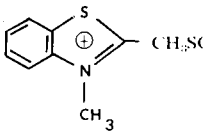 | —NHCH₃ | —NHCH₃ | —CN | —CH₃ | red |
| 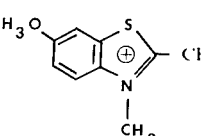 | —N(C₂H₅)₂ | —N(C₂H₅)₂ | —CN | —CH₃ | red |

-Continued

| A and X⁻ | R₁ | R₂ | R₃ | R₄ | Shade |
|---|---|---|---|---|---|
| benzothiazolium, N-CH₃, CH₃OSO₃⁻ | —NHC₂H₅ | —NHCH₂CH₂CH₂N(CH₃)₂ | —CN | —CH₃ | red |
| 1,3-dimethyl triazolium fused to chlorobenzene, CH₃SO₄⁻ | —NHCH₃ | —NHCH₃ | —CN | —CH₃ | scarlet |
| 1-(4-chloro-2-methylphenyl)-2-methyl-3,5-dimethylpyrazolium, CH₃SO₄⁻ | —NHC₂H₅ | —N(C₂H₅)₂ | —CN | —CH₃ | Orange |
| 1,3-dimethyl-2-phenyl pyrazolium, CH₃SO₄⁻ | —NHCH₃ | —NHCH₃ | —CN | —CH₃ | Orange |
| 2,3-dimethyl-4-methyl-thiadiazolium, CH₃SO₄⁻ | —NH(CH₂)₂CH₃ | —NHC₂H₅ | —CN | —CH₃ | red |
| 1,3,4,5-tetramethyl thiazolium, CH₃SO₄⁻ | —NHCH₂CH₂OH | —NHC₆H₅ | —CN | —CH₃ | red |
| 1,3-dimethyl-benzotriazolium (chloro substituted), CH₃SO₄⁻ | —NH(CH₂)₂OCH₃ | —NH(CH₂)₂OCH₃ | —CN | —CH₃ | red |

We claim:
1. A basic azo dyestuff of the formula

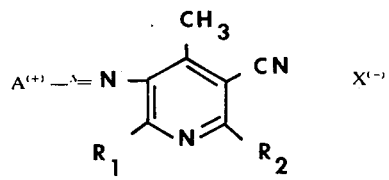

where A⁽⁺⁾ is
trialkylammonium phenylene,

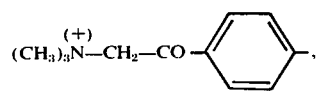

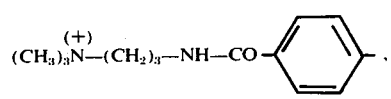

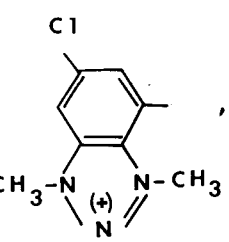

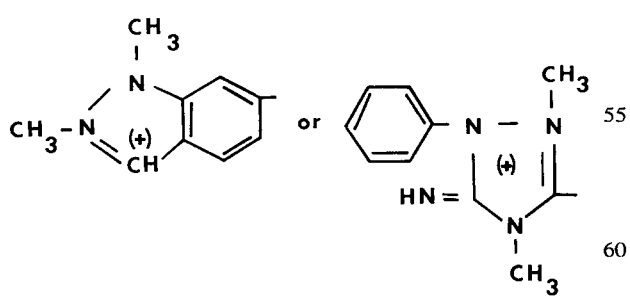

$R_1$ and $R_2$ each are methylamino, ethylamino, β-hydroxyethylamino or γ-methoxypropylamino, and $X^{(-)}$ is an anion.

2. The dyestuff of claim 1 which is

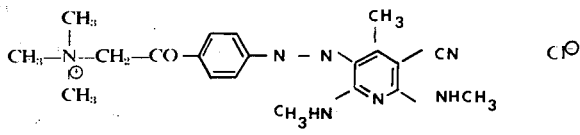

3. The dyestuff of claim 1 which is

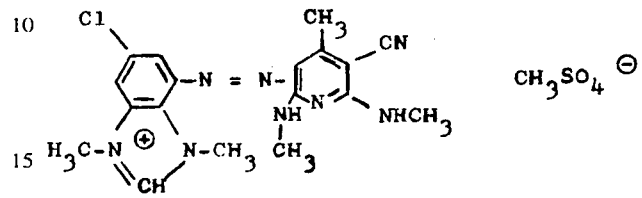

4. The dyestuff of claim 1 which is

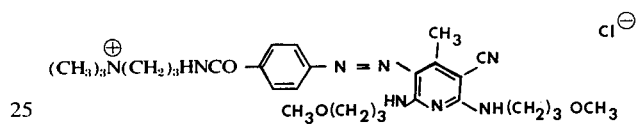

5. The dyestuff of claim 1 which is

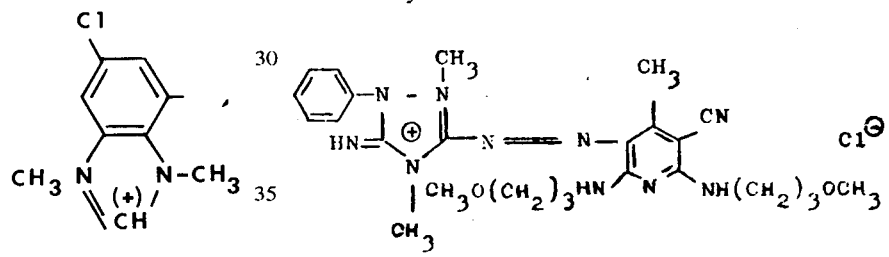

6. The dyestuff of claim 1 which is

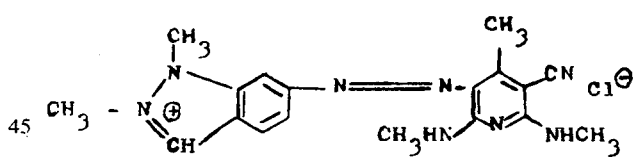

7. The dyestuff of claim 1 which is

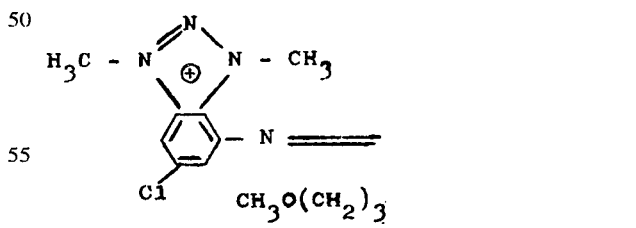

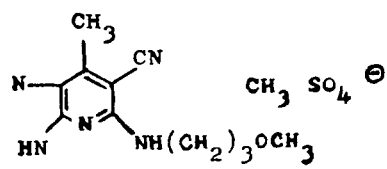

* * * * *